United States Patent

[11] 3,617,274

[72] Inventor Lawrence H. Lin
    Chatham Township, Morris County, N.J.
[21] Appl. No. 717,207
[22] Filed Mar. 29, 1968
[45] Patented Nov. 2, 1971
[73] Assignee Bell Telephone Laboratories, Incorporated
    Murray Hill, N.J.

[54] HARDENED GELATIN HOLOGRAPHIC RECORDING MEDIUM
    5 Claims, 3 Drawing Figs.

[52] U.S. Cl. .................................... 96/27 H,
    96/40, 96/75, 350/3.5
[51] Int. Cl. .................................... G03c 5/04,
    G03c 9/00
[50] Field of Search .................................... 96/27 H,
    75, 93, 40; 350/3.5

[56] References Cited
    UNITED STATES PATENTS
    1,875,292 8/1932 John .................................... 96/93
    2,150,757 3/1939 Bodine .................................... 96/50

OTHER REFERENCES
Rogers I: G. L. Rogers, Proc. Roy. Soc. Edinburgh, A63, 193 (1952) pp. 218, 219.
Rogers II: G. Rogers, Perspective, 8, No. 4 (1966) pp. 261-4, 269-75.
Focal: Focal Encyclopedia of Photography, Vol. I, (1965) pp. 166, 167.

*Primary Examiner*—Norman G. Torchin
*Assistant Examiner*—John Winkelman
*Attorneys*—R. J. Guenther and Edwin B. Cave ABSTRACT: A holographic recording medium comprising a hardened gelatin film sensitized with a chromate or dichromate. Exposure effects a change in the index of refraction in the exposed areas of the film, which can then be used without further processing, or washed to remove the sensitizer to make a permanent record.

INVENTOR
L.H. LIN

HARDENED GELATIN HOLOGRAPHIC RECORDING MEDIUM

This invention relates to the recording of information by holography—and, in particular embodiments, to the making of interferometric measurements and diffraction gratings—by a technique employing a hardened, sensitized gelatin film as the recording medium.

Field of the Invention

The invention is of general importance to the field of holography as it presents a new holographic recording medium; and, inasmuch as the invention can be employed in the making of high quality diffraction gratings at very low cost, it also pertains to apparatus and techniques which use them.

Background of the Invention

It is commonplace to find holograms made in recording media of photographic emulsions. The photographic plate, on which the hologram is to be recorded, has its emulsion exposed by interfering incident laser beams, one representing, perhaps, an information beam and the other a reference beam. As is the case with ordinary photography, the exposed emulsion is developed and fixed to yield a medium having a nonuniform density of light-absorbing silver particles, the nonuniformity being related, of course, to the variation in light intensity of the object of interest. In holography, then, as in common photography, reconstruction depends upon the ability of the developed emulsion medium to absorb the light used to "read" the recorded information and hence the process is inherently a lossy one.

Unlike ordinary photography however, holography does not record an image, but rather an extremely complex interference pattern; indeed, the hologram is, in essence, a complicated diffraction pattern. Unfortunately, due to their lossy nature, photographic emulsion holograms are not very efficient; moreover, the grain structure of a photographic emulsion is an inherent limiting factor of resolution and quality of diffraction.

It is known in general, however, that a variation of the refractive index of a transmitting recording medium, rather than variation of opacity, would result in desired diffraction with lower losses. An approach along this line has been to use soluble transmitting media which are selectively rendered insoluble upon exposure to light, and then subjected to an etching step which removes the still-soluble portions, thereby resulting in a surface characterized by a variation in thickness of the media. Diffraction, which results in reconstruction, is based on the differences in the indices of refraction of the media and air, and increases with increasing $\Delta n \cdot t$, where $\Delta n$ is the difference in the indices of refraction, and $t$ is the thickness of the media.

This technique, however, has certain undesirable limitations. Because $\Delta n$ is brought about by the removal of material through etching, grey areas of the subject of interest, which are to be translated to the hologram as areas where insolubilization is only partially complete, are often not faithfully recorded. Also, thin films on the order of just a few microns are necessary to minimize undercutting during etching; this, however, as indicated by the above equation, is contrary to what is desired. As further disadvantages, the soluble media used typically tend to suffer distortion (e.g. swelling) during etching, especially at small dimensions, and exhibit high noise to signal ratios. The hardened gelatin recording medium of this application overcomes these, and other, limitations.

In accordance with the invention, it has been found that sensitized, hardened gelatin films are excellent media for recordation of information by holography. A hardened gelatin film is sensitized to exhibit a light-response by contacting it with an appropriate sensitizer solution; thus sensitized, the film is then exposed in the usual holographic manner; after exposure the film may be water washed to effect desensitization and to reduce noise characteristics; and, finally, remaining water from the previous washing step may be removed by contacting the film with a water-soluble medium which itself is sufficiently volatile to be self-removing.

For certain special purposes, such as for moire interferometry, it may be desirable to eliminate the processing steps which follow exposure.

It is also possible to employ initially unhardened gelatin and to insert a hardening step subsequent to exposure but before the washing step.

The invention will be further described and particularized in the following detailed description in conjunction with the accompanying drawing in which.

DETAILED DESCRIPTION

Figure 1:
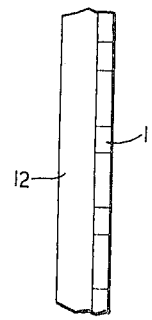
FIG. 1 is a diagrammatic representation of a side view of a transmittance hologram.

The underlying principle of any hologram or diffraction grating is the interference of light. When interference is brought about by a periodic variation in the transmittance of the recording medium, such as by alternating opaque and transparent bands, the hologram is of the so-called spatial transmittance type. A portion of a transmittance hologram is depicted in FIG. 1 which shows opaque material 1 on substrate 12. A photographic emulsion hologram, for example, is of this type.

Figure 2:
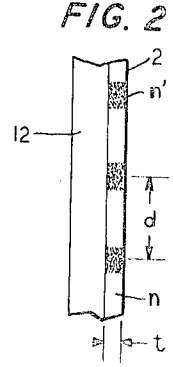
FIG. 2 is a diagrammatic representation of a side view of a phase grating of the invention.

In another case, and in accordance with this invention, interference is achieved not through variation in transmittance, but by a spatial variation in the index of refraction of a transmitting medium, which in turn effects a phase shift and hence interference. A phase shift hologram or grating is shown in FIG. 2 where recording medium 2 on substrate 12 has a variation in its refractive index between values $n$ and $n'$, the material with the latter value represented by the dotted areas.

The effectiveness of a phase shift grating depends upon the magnitude of the differences in the refractive indices at points throughout the recording medium.

Theoretical treatment of phase gratings of this type has shown that the ratio $\eta$ of the diffracted intensity that contributes to the reconstruction of the original wave front to the intensity of the reconstructing beam is a maximum of 0.339 for thin films and 1.0 for thick ones. (See Kogelnik, Proceedings of the Symposium of Modern Optics, Brooklyn Polytechnic Press N.Y. 1967). The hardened gelatin system of the invention is capable of achieving efficiencies approaching the maximum values for thick phase type holograms predicted by theory. This should be compared to photographic emulsion holograms whose efficiencies are roughly about 0.04.

The hardened gelatin films to be used with the invention can be made by hardening gelatin with conventional and well-known gelatin hardening solutions. The term "hardened gelatin" as used herein, generally refers to gelatin which is not readily soluble in water, especially when brought into contact with water for relatively short times, typically under 5 minutes.

The sensitizer has as its function the bringing about, in the gelatin film, of local changes in the index of refraction that are of a magnitude sufficiently high to effect useful diffraction. Suitable sensitizers are, for example, dichromates, such as ammonium or potassium dichromate; other sensitizers can be employed also. Experiments reported herein typically used the yellow-orange reaction product which crystallized when a saturated aqueous solution of 5 ml. pyridine and 7 grams $CrO_3$ were added to excess acetone at $-10°C$.

It is contemplated that commercial use of the inventive technique will make use of initially hardened gelatin films, rather than of soluble gelatin films which would have to be hardened after exposure, although the invention is not limited to such a preferred mode of use. However, if initially soluble films are used, the sensitizer, in solution, can be admixed with the aqueous gelatin during the film-making stage. Amounts of sensitizer up to its solubility limit in aqueous gelatin is acceptable, and, as a lower limit, there should be present a sufficient amount to effect a meaningful change in the index of refraction of the film upon exposure. In terms of weight ratio of dichromate sensitizer to gelatin, these limits are about 0.6 and 0.1, respectively.

But for the preferred mode of use, prehardened gelatin films are sensitized by contact with a solution of sensitizer to result in some form of association of sensitizer with the gelatin material. Typically, with dichromates, the concentration of sensitizer is from 0.1 to 10 weight percent in aqueous solution; greater amounts tending to produce unwanted precipitation of sensitizer on the film. Generally, from 3–5 minutes represents preferred times for effecting good sensitization without appreciably softening the hardened gelatin. Sensitizing can be performed at room temperature. Upon its removal from the solution, the film is allowed to dry. Since sensitized gelatin films may undergo a dark reaction, they should preferably be used soon after drying.

Figure 3:
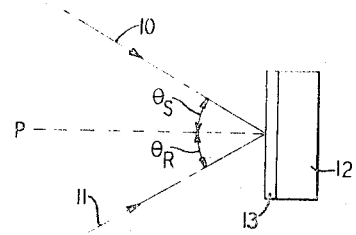
FIG. 3 is a diagrammatic representation of a method for recording by holography.

The making of the hologram is straightforward, and is depicted in FIG. 3. Source beam 10 and reference beam 11 (both of which can include any source of diffuse laser energy) are directed at a sensitized gelatin film 13 (hardened or unhardened) on substrate 12, the beam impinging at angles $\theta_S$ and $\theta_R$, respectively defined by the beam and the normal P to film 13. During exposure, the interference wave front which results from the interfering of source beam 10 with reference beam 11 is recorded. Immediately after exposure, a hologram made in this manner will exhibit about a 0.20 efficiency. (Compare this to the 0.04 efficiency of a processed photographic plate).

Generally, reconstruction efficiencies greater than 0.20 are desired and, as will be hereinafter shown, they can be achieved with the invention. However, where certain measurements are to be made by moire interferometry, the lesser efficiencies are amply compensated for by the elimination of the need to remove the exposed film from its exposure position for any development.

In such an interferometric experiment, which can be generally conducted in the manner of FIG. 3, sources of diffuse energy are used in exposing the recording medium. Information about the sources contained in the interference wave front produced is recorded in the form of a complicated spatial variation in some property of the medium, which is then removed, processed to a developed hologram and compared to another but similar interference pattern. Comparison is carried out by repositioning the now developed hologram at the exposure position and directing a second wave front at it. Differences between the wave fronts appear as moire interference fringes, but imprecise positioning of the hologram will create fringes even when identical information is compared. Accordingly, repositioning is critical and often a source of difficulty.

It is therefore apparent that by use of the sensitized hardened gelatin films of the invention, this problem can be entirely eliminated, since a 0.20 efficiency can be obtained without ever having to remove the film after the first information has been recorded, e.g., no photographic development or photoresist type etching steps are necessary to effect an operating hologram capable of producing moire fringes upon immediate comparison to new information.

Of course, in most applications, whether for moire interferometry or otherwise, the hologram is to be made a permanent record. This requires desensitization of the exposed film to arrest further changes which may be caused by additional exposure or by the dark-reaction. This is accomplished simply by washing the hologram in running water for several minutes. Since the hologram is always already hardened by this point in its processing, the wash step does not produce any noticeable unwanted distortion of the kind that could result from the etching out of unhardened gelatin by water. Accordingly, it is possible to further process the hologram to achieve a reduction, virtually to nothing, of any characteristic that detracts from its optical clarity.

After the wash the hologram is, of course, wet. If allowed to naturally dry out, however, its efficiency will drop from about 0.20 to approximately 0.10, far below theoretical maximum. However, the efficiency can be brought up to the theoretical maximum if, before it dries, surface water is removed by contacting the wet hologram with a water-absorbing solvent that is not harmful to the hardened gelatin and is itself sufficiently volatile to be self-removing. Solvents such as absolute ethanol and absolute propanol are just two examples.

The sensitized hardened gelatin system of the invention suffers from no special limitation upon film thickness, and it is contemplated that thicker films whenever advantageous will be used. Holograms of 15-micron thick hardened gelatin films on glass can exhibit efficiencies up to the theoretical maximum (1.0) for thick films.

Also, as it is the case that the change in the local index of refraction is about linear with exposure of the hardened gelatin hologram, recordation of the greys in a manner far superior to that possible for the etched type systems is obtained. Accordingly, sensitized hardened gelatin holograms are excellent high-efficiency, phase type holograms capable of being used even when exposed to highly modulated information.

Of course in the case where both source beam 10 and reference beam 11 are essentially unmodulated, the recorded interference wave front is uncomplicated and in the form of a simple diffraction grating pattern of alternating exposed and unexposed areas. A developed phase grating made in this manner is diagrammatically shown in FIG. 2, where a grating of thickness $t$ is shown with a grating spacing $d$.

The resolution obtainable with this inventive system is comparable or better to those of high resolution photographic films, but of course the efficiencies of the gelatin holograms, being phase holograms, are much greater.

What is claimed is:

1. A method of holographically recording an interference pattern comprising the steps of hardening a gelatin film so as to render said film substantially insoluble in aqueous media, sensitizing said film to effect a change in the index of refraction upon exposure, said sensitizing being carried out by contacting said film with an aqueous solution containing a sensitizer selected from the group consisting of chromate and dichromate sensitizers, and exposing the film to interfering source and reference beams thereby effecting a change in the index of refraction of the film in the exposed areas.

2. The method of claim 1 wherein the film is contacted with a 0.1 to 10 weight percent dichromate solution for about 3 to 5 minutes.

3. A method in accordance with claim 1 wherein following exposure, the film is substantially desensitized by contacting it with a water wash.

4. A method in accordance with claim 3 wherein following the water wash, the film is contacted with a water absorbable volatile solvent, and the film is dried by allowing the solvent and water to evaporate.

5. The hologram produced in accordance with the method of claim 4.

* * * * *